(12) United States Patent
Webster et al.

(10) Patent No.: US 9,332,874 B2
(45) Date of Patent: May 10, 2016

(54) BEVERAGE FLAVORING POD EJECTION SYSTEM AND METHOD

(75) Inventors: Joseph P. Webster, St. Charles, MO (US); David L. Brandsma, St. Charles, MO (US); Jerry Walls, Sunset Hills, MO (US); Billy Castleberry, Lubbock, TX (US)

(73) Assignee: Newco Enterprises, Inc., St. Charles, MO (US)

( * ) Notice: Subject to any disclaimer, the term of this patent is extended or adjusted under 35 U.S.C. 154(b) by 1097 days.

(21) Appl. No.: 13/385,202

(22) Filed: Feb. 7, 2012

(65) Prior Publication Data

US 2012/0207894 A1  Aug. 16, 2012

Related U.S. Application Data

(60) Provisional application No. 61/463,302, filed on Feb. 15, 2011.

(51) Int. Cl.
*A23F 5/00* (2006.01)
*A47J 31/36* (2006.01)

(52) U.S. Cl.
CPC .................................. *A47J 31/3638* (2013.01)

(58) Field of Classification Search
CPC .................................................. A47J 31/3638
USPC ....... 99/295, 316, 288, 283, 289 R, 205, 300, 99/304, 306, 307, 279; 426/433
See application file for complete search history.

(56) References Cited

U.S. PATENT DOCUMENTS

| 4,791,859 | A | 12/1988 | King |
| 5,134,924 | A | 8/1992 | Vicker |
| 5,161,455 | A | 11/1992 | Anson et al. |
| 5,404,794 | A | 4/1995 | Patel et al. |
| 5,836,236 | A | 11/1998 | Rolfes et al. |
| 6,345,570 | B1 | 2/2002 | Santi |
| 6,481,339 | B1 * | 11/2002 | Castleberry ............... 99/305 |
| 6,510,783 | B1 | 1/2003 | Basile et al. |
| 6,857,353 | B2 | 2/2005 | Kollep et al. |
| 6,904,840 | B1 | 6/2005 | Pfeifer et al. |
| 7,210,401 | B1 | 5/2007 | Rolfes et al. |
| 2009/0101020 | A1 * | 4/2009 | Webster et al. ........... 99/289 R |

FOREIGN PATENT DOCUMENTS

| EP | 1948534 | 7/2008 |
| IT | GE20050077 | 4/2007 |

* cited by examiner

*Primary Examiner* — Phuong Nguyen
(74) *Attorney, Agent, or Firm* — Paul M Denk

(57) ABSTRACT

A mechanical waste pod ejector system for a single cup pod beverage flavoring machine that has a lower head with a holding chamber therein, for holding a pod during a flavoring operation, which head mechanically ejects the pod after usage. The system includes a pod ejector mechanism, a pod support plate sized to engage the pod, and actuator head, with a pod ejector controller including a cam slide surface for moving the lower head from a flavoring position to a pod disposal position.

7 Claims, 2 Drawing Sheets

BEVERAGE FLAVORING POD EJECTION SYSTEM AND METHOD

CROSS REFERENCE TO RELATED APPLICATION

This non-provisional patent application claims priority to the provisional patent application having Ser. No. 61/463,302, having filing date Feb. 15, 2011; and, this application claims priority to the non provisional application having Ser. No. 12/152,325, now U.S. Pat. No. 8,490,542, and which patent claimed priority to the provisional application having Ser. No. 60/930,459, filed on May 16, 2007, and which application claimed priority to the regular letters patent application having Ser. No. 10/917,501, filed on Aug. 12, 2004, and which claimed priority to the provisional patent application having Ser. No. 60/495,761, filed on Aug. 15, 2003.

FIELD OF THE INVENTION

This invention is a system and method for removing a beverage flavoring pod, such as a single serve coffee pod, from a beverage flavoring or brewing apparatus that flavors or brews a single dose or cup of a beverage, such as coffee, then automatically disposes of the spent beverage flavoring pod.

BACKGROUND OF THE INVENTION

Prior art systems such as are disclosed in Rolfes U.S. Pat. No. 7,210,401, which is directed to a single cup pod beverage brewer, generally employ upper and lower heads of known designs, with the lower head including a chamber therein for holding the coffee or other beverage flavoring pod, wherein the upper and lower heads are movably engagable with one another to close the beverage flavoring chamber and to pass a liquid, such as heated water, through the chamber and the beverage flavoring pod therein. In general, such systems are so designed that the lower head is movable between a pod receiving, or pod loading, position at which the beverage flavoring pod is inserted by a user into the chamber formed in the lower head, a beverage flavoring position at which the actual beverage flavoring operation is effected, and a pod disposal, or pod discharge, position at which the waste pod is then ejected from the chamber in the lower head into a waste bin.

The Rolfes system includes a pod support plate or disc within the chamber of the lower head, upon which pod support disc the beverage flavoring pod generally rests. Such pod support disc is attached to a spring loaded stem construction that is intended to hold the support disc tightly to a sealing o-ring within the chamber to prevent leakage when the lower head is in a beverage flavoring position and to operate to forcibly eject the pod from such chamber into a pod waste bin when the lower head is moved to the pod disposal position.

The system and method of the present invention is an improvement over the pod ejection system of beverage flavoring devices such as that disclosed in Rolfes U.S. Pat. No. 7,210,401 and the use therein and therewith of an electro-mechanical solenoid kicker to strike the ejector stem to effect pod removal or ejection. The Rolfes system, as stated in the specification and in claim 1 of Rolfes U.S. Pat. No. 7,210,401, makes use of "a pod ejection means for removing a pod after infusion from the lower head by electro-mechanically propelling a pod from the chamber when the lower head is oriented vertically, thereby totally removing a pod from contact with the lower head for disposal, wherein said vertical pod ejection means further comprises, a pod ejection solenoid striking said ejection disc stem such that a pod is driven completely away from the lower head."

Two common problems have typically been encountered with the Rolfes electro-mechanical pod ejection system and method, which problems involve 1) the electromagnet-solenoid and 2) the spring that is intended to hold the pod support disc, sometimes also referred to as the pod ejection disc, to a sealing o-ring inside the lower brew chamber.

In the Rolfes system, when the pod ejection solenoid operates in the manner as noted hereinabove to cause the striker pin to strike the pod ejection disc stem, coffee residue from the brew chamber is frequently transferred onto the solenoid shaft, which residue, over time, builds up inside the solenoid body itself and dries up. Such buildup of residue causes the shaft to stick, and to eventually seize, and thus prevents the solenoid striker pin from effectively striking the pod ejection disc. Such seizure of the shaft causes the waste pod removal feature of the machine to become disabled and to fail. As a consequence of such failure, the waste pod is not properly ejected and is, instead, often thereafter undesirably presented to the next user when the lower head is moved to the pod loading position for installation by such next user of a new beverage flavoring pod and for initiation of a new beverage flavoring cycle.

Also, with the Rolfes system, the spring loading that can be employed is necessarily limited in that the force of the solenoid striker must be able to readily overcome such spring loading in order to permit sufficient movable extension of the ejection stem and the attached pod support disc so as to effect ejection of the waste pod. Consequently, the compression spring tension holding the pod support disc to the sealing o-ring mounted in the lower brew chamber during the actual beverage flavoring is generally of a relatively low value and is often of insufficient force to effectively maintain a seal and to keep the brew chamber from weeping coffee while brewing, especially since the spring force cannot be appreciably increased without degrading or negating the ejection force from the electro-mechanical solenoid when it strikes the ejection disc stem and rendering the pod ejection system inoperable.

SUMMARY OF THE INVENTION

The improved system and method for removing the spent waste pod from a beverage flavoring device according to the present invention substantially resolves such problems. The present invention involves removing and discarding the electro-mechanical solenoid that strikes the ejection disc and installing, for effecting waste pod ejection, an alternative, mechanical system that ameliorates the problems encountered with the Rolfes system.

The replacement system of the present invention employs a mechanical slope cam construction so positioned that the ejection stem contacts and rides upon the cam slope as the system moves the lower head and the pod in the chamber thereof from the beverage flavoring position to the pod disposal position. As the lower head is moved in a rotational arc from the beverage flavoring position to the pod disposal position, which operation is well known from such prior art constructions, gradually increasing pressure is applied to the ejection stem and therethrough to the pod support disc. As the ejection stem is forced increasingly outward relative to the lower head as the stem rides down a plastic glide on the mechanical slope cam, the waste pod resting upon the pod support disc is mechanically urged outwardly out of the chamber by such disc to fall out of the lower head and into the pod waste bin.

Because the improved system and method does not have or require an electro-mechanical solenoid to eject the waste coffee pod, the problem of the electro-mechanical solenoid drying out and sticking is resolved.

Moreover, since the improved system and method does not employ an electro-mechanical solenoid to eject the waste pod, the spring pressure on the sealing O-ring in the chamber of the lower head can be greatly increased, such as in an amount of ten-fold, thereby also eliminating or minimizing the problem of coffee weeping while brewing.

DESCRIPTION OF THE PREFERRED EMBODIMENT

Inasmuch as Rolfes U.S. Pat. No. 7,210,401 is the closest known prior art, the description of features and operation of the brewing apparatus thereof may generally be considered to correspond to features and operations of a beverage flavoring apparatus according to the present invention, except with regard to the pod ejection system of the present invention, and the descriptions as set forth in Rolfes U.S. Pat. No. 7,210,401 are therefore incorporated hereinto by reference thereto, except to the extent that the description of any feature therein or operation thereof is inconsistent with the description of the present invention and its operation as presented herein.

In light thereof, because such other features of Rolfes U.S. Pat. No. 7,210,401 and their operation are within the prior art and are readily understood by those skilled in the art, it is not considered necessary to herein discuss and explain in detail all such prior art features and their operation, including features such as are depicted in FIGS. 17-25 and 27-30 of such patent, and the operation thereof, including the movement of the lower head from a pod receiving or pod loading position, such as shown in FIG. 28 of Rolfes U.S. Pat. No. 7,210,401, to a beverage flavoring position, as shown in FIG. 29 of Rolfes U.S. Pat. No. 7,210,401, and then to a pod disposal or pod discharge position, such as shown in FIG. 30 of Rolfes U.S. Pat. No. 7,210,401. In general, a beverage flavoring device according to the present invention will include many of the same or similar components.

Figure 1:
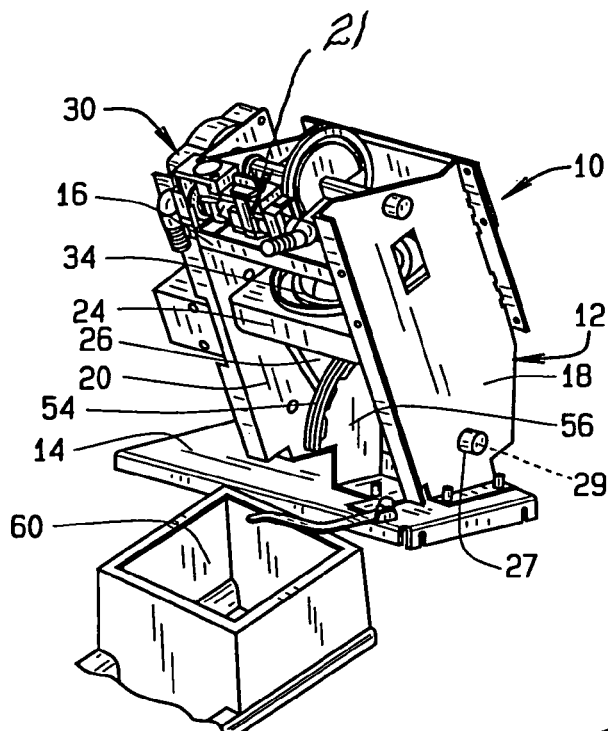
FIG. 1 is an isometric, perspective view of a beverage flavoring mechanism of a beverage flavoring and dispensing machine, with the portion of the beverage flavoring mechanism in the foreground generally constituting the rearward portion of the mechanism and the hidden portion in the background generally constituting the forward portion of the mechanism.

With reference now to the drawings, wherein like numbers correspond to and identify generally like components of a pod ejection system according to the present invention, FIG. 1 depicts a preferred construction 10 of a beverage flavoring pod holding mechanism, that includes an upper head mounting frame 12 installed upon a base 14, with an upper head 16 mounted between two channel shaped columns 18 and 20. These constitute the support assembly for the system. And, the upper head 16 holds the control assembly 21.

For purposes of further discussion herein the portion to the left side of FIG. 1 and in the foreground is considered to be the rear portion of such construction and the portion to the right side of FIG. 1 and in the background is considered to be the forward portion of the construction. Consequently, relative to the various figures of this application, rearward movement, or movement to the rear, of various components should thus generally be considered movement towards the left in FIG. 1 and forward movement, or movement towards the front, should thus generally be considered movement towards the right in FIG. 1, with corresponding movements in the other figures.

Lower head 24 is supported by two spaced, generally alike, support arms 26 that have upper ends attached to lower head 24 and lower ends rotatably connected to respective inner sides of columns 18 and 20 at pivot connections 27 to define a rotation axis 29 about which the support arms 26 and attached lower head 24 can pivot to move lower head 24, in an arc, between pod loading, beverage flavoring, and pod disposal positions. Rotational movement of the support arms 26, and attached lower head 24, about rotation axis 29 is controlled by a lower head positioning solenoid or motor 30, shown mounted to upper head support column 20.

Figure 2:
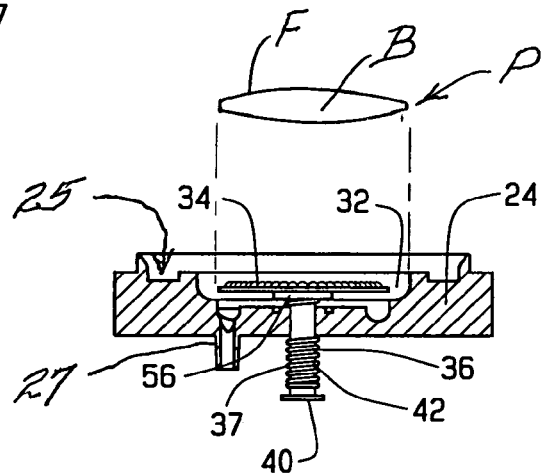
FIG. 2 is a partial, cross sectional view of the lower head generally showing the pod holding chamber thereof and the pod support and ejection mechanism associated therewith when the lower head is positioned, generally, in the beverage flavoring position.
Figure 3:
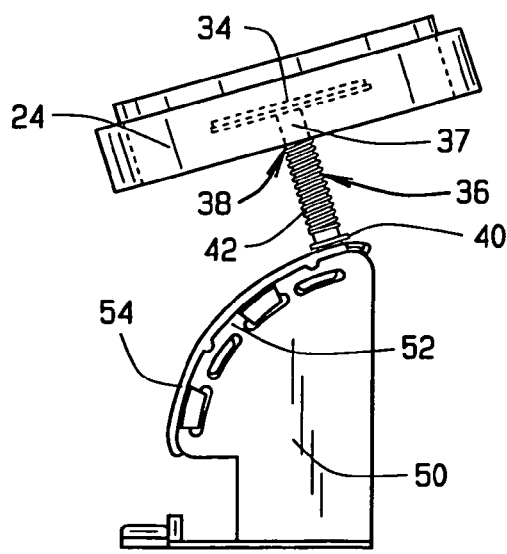
FIG. 3 is a partially stylized side view of the lower head when such lower head is positioned, generally, in an intermediate position very slightly rearwardly from the beverage flavoring position.

The lower head 24 includes a chamber 32 formed therein, preferably approximately centered therein, sized to receive and hold a beverage flavoring pod that will rest upon a pod support disc 34 disposed in the bottom of the chamber 32. As is perhaps best seen in FIGS. 2-4, pod support disc 34 is part of a spring loaded pod support and ejection mechanism or controller 36 that also includes an ejector stem 37 attached to pod support disc 34 and extending through an opening 38 that is preferably approximately centered in the bottom of chamber 32 to a stem end cap or actuator head that includes a low friction flat disc 40. A spring 42 is disposed about ejector stem 37 to be compressible between a lower surface of lower head 24 and the end cap to bias the pod support disc 34 to generally hold it against the bottom of chamber 32, as best seen in FIG. 2, when lower head 24 is in the pod loading position and later in the beverage flavoring position. As the lower head support arms 26 are rotated rearwardly about rotation axis 29, lower head 24 is moved in an arc between its pod loading, beverage flavoring, and pod disposal positions, with ejector stem 37 and low friction flat disc 40 projecting beneath the bottom of lower head 24.

As known in the art, these pods P, include an outer casing of filer paper F, encapsulating a beverage flavoring material B.

Support bracket 50 is installed on base 14 between channel members 18 and 20 and also between the spaced lower head support arms 26, preferably approximately centered therebetween. Support bracket 50 is preferably an upstanding bladelike construction that includes an arcuately shaped outer surface 52 along a rearwardly extending external portion thereof, with a plastic slide 54 conformably positioned along such arcuately shaped surface 52.

Figure 4:
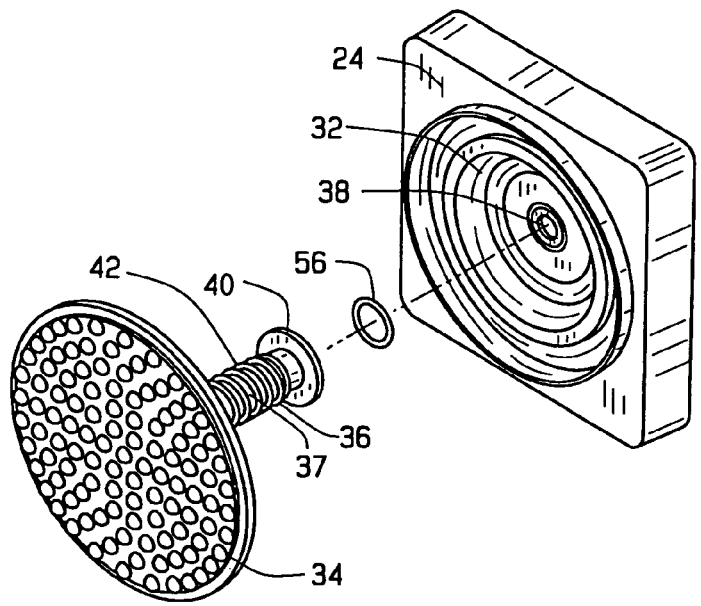
FIG. 4 is a partially exploded view of the lower head and the pod holding chamber thereof in conjunction with the pod support and ejection mechanism associated therewith and a chamber sealing o-ring.

During the beverage flavoring operation, upper head 16 and its lower surface 17, and lower head 24 and its surface 25 are urged into a generally tight engagement with one another to effectively seal, including with the use of o-rings, the chamber 32 therebetween. This is the system sealing mechanism. The support bracket 50 is so sized and positioned that, when lower head 24 is in the beverage flavoring position, flat disc 40 will preferably not be in contact with or rest upon plastic slide 54, and pod support disc 34 will be biased by the spring loading of spring 42 towards the bottom of chamber 32. An O-ring 56, as shown in FIGS. 2 and 4, is preferably employed within chamber 32 below pod support disc 34 to seal the lower portion of chamber 32 to prevent leakage of liquid through the hole 38 through which pod ejector stem 37 passes. Heated water is delivered to the upper head 16 through the conduits 19. The flavored beverage exists through the outlet 27.

Figure 5:
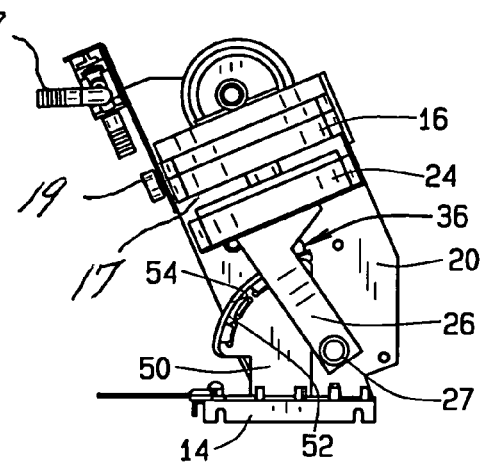
FIG. 5 is a more detailed side view of a portion of the beverage flavoring mechanism, with the channel-shaped column shown in the foreground in FIG. 1 removed for clarity, better showing one of the support arms for the lower head and the pivot connection therefore, with the lower head shown being moved slightly rearwardly from the beverage flavoring position towards the waste pod removal position.

Following completion of the actual beverage flavoring operation, the upper and lower heads disengage from one another by means of an actuator head, and the lower head 24 begins to be moved rearwardly from the beverage flavoring position to an intermediate position such as is shown in FIG. 5 by rotation of spaced arms 26 about rotation axis 29. As such movement occurs; the flat disc 40 is caused to move into contact with plastic slide 54 near the top of support bracket 50, with pod support disc 34 generally still being held near the bottom of chamber 32 by the spring 42 about ejector stem 37.

Figure 6:
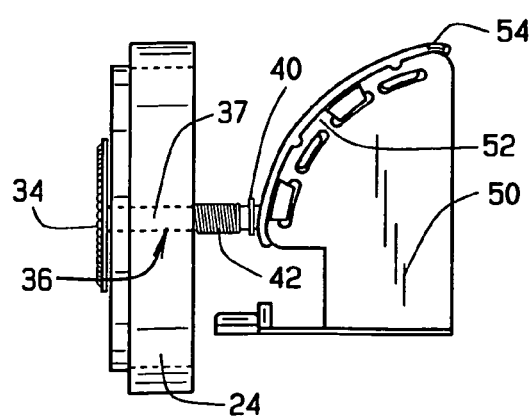
FIG. 6 is a side view of the lower head when at the waste pod removal position.

Thereafter, as the lower head 24 is further moved rearwardly towards the pod disposal position, such as shown in FIG. 6, by rotation of the support arms 26 about rotation axis 29, flat disc 40 will ride on plastic slide 54 to gradually mechanically urge attached ejector stem 37 generally upwardly through hole 39 in the lower head 24 to gradually push pod support disc 34 and the waste pod being supported thereby within chamber 32 upwardly and outwardly from the chamber 32. This is the mechanical pod ejection controller of the system. As the ejector stem 37 is urged upwardly through hole 38, the spring 42 is increasingly compressed between the underside of lower head 24 and the end cap with its flat disc 40, the purpose of which spring compression will be further discussed hereinafter.

The movement of the pod support disc 34 to push the waste pod from the lower brew chamber 32 into the waste bin 60 is determined by the position of the low friction flat disc 40 relative to the contact with the low friction cam slide surface 54, which is mounted upon the arcuate outer surface 52 of the rigid and fixed support bracket 50. The position of the low friction flat disc 40 relative to the low friction cam slide surface 54 is determined by the fixed distance at which the lower head 24 is attached to the support arms 26, the location of rotational axis 29, and the position and particular configuration of the support bracket 50 and of the arcuate portion 52 to which the cam slide surface 54 is mounted. Preferably, the bracket 50, with its arcuate portion 52, are so installed and configured that the distance between the bottom of lower head 24 and the cam slide surface 54 gradually decreases as the support arms 26 are rotated about rotational axis 29 to move lower head 24 from the beverage flavoring position to the waste pod disposal position, typically with ejector stem 37 maximally extending below the bottom of lower head 24 when lower head 24 is in pod loading and beverage flavoring positions and minimally extending below the bottom of lower head 24 when lower head 24 is in the waste pod disposal position.

Once pod disposal has been effected, support arms 26 and supported lower head 24 can be rotatably moved forwardly back through the beverage flavoring position and towards the pod holding position to complete a beverage flavoring cycle. Oftentimes, forward rotation may be interrupted prior to movement of the lower head 24 all the way to the pod loading position, and the lower head 24 may be maintained in a rest or idle position thereat while awaiting initiation of a new beverage flavoring cycle, preferably with the lower head 24 disposed interiorly of an external shell of the beverage flavoring machine.

Such external shell may take many forms, including forms similar to that as disclosed in U.S. application Ser. No. 11/899,417, which is incorporated herein by reference thereto, but wherein the access slot in the upper front face of the shell is configured to permit the lower head 24 to be advanced therethrough for pod loading by a user, similarly to what is shown in FIG. 6 of Rolfes U.S. Pat. No. 7,210,401.

As the lower head 24 is moved towards such rest or idle position, spring 42 will urge the end cap on ejector stem 37 outwardly from the bottom of lower head 24 to draw pod support disc 34 back into chamber 32 as flat disc 40 rides back up along the plastic slide 54 on the arcuately shaped outer surface 52 of support bracket 50. When the forward rotation of support arms 26 carries lower head beyond the point at which flat disc 40 is in contact with plastic slide 54, pod support disc 34 should preferably be fully retracted into chamber 32 and held in such position by the spring loading acting against the end cap and its flat disc 40.

When a user desires to initiate a new beverage flavoring cycle, the user may then actuate appropriate controls, such as are well known in the art, to effect movement of the lower head 24 forwardly to a pod loading position, at which a new beverage flavoring pod can be installed to rest upon pod support disc 34 in chamber 32, and to thereafter effect commencement of further movement of the lower head to the beverage flavoring position and the beverage flavoring operation.

In light of all the foregoing, it should thus be apparent to those skilled in the art that there has been shown and described an improved beverage flavoring pod ejection system and method. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

We claim:

1. A single cup pod beverage flavoring machine that utilizes a sealed beverage pod that contains beverage flavoring material surrounded by filter paper and formed in a disc-like shape for automatically flavoring a beverage one cup at a time, comprising:

a beverage flavoring pod holding mechanism for receiving and retaining a beverage pod during a flavoring operation, said beverage flavoring pod including a holding mechanism forming a chamber including an upper head and a lower head with said lower head including a recess therein forming e said holding chamber for the beverage flavoring pod, said upper and lower heads being movable relative to one another to engage with one another to enclose the beverage flavoring pod within said holding chamber in a beverage flavoring engagement position and to effect a generally water tight seal between said upper and lower heads in such position and to thereafter disengage from said beverage flavoring engagement, said upper head having a water inlet on a top surface and said lower head having a liquid outlet on a bottom surface for passing water through the beverage pod within said holding chamber during a flavoring operation, a support assembly supporting said upper and lower heads within said beverage flavoring machine in desired positions during the flavoring operation, said support assembly including a mechanism for arcuately moving said lower head between pod receiving, beverage flavoring, and pod discharge positions, a control assembly operable during the course of a flavoring operation to effect movement of said lower head from said pod receiving position to said beverage flavoring position, to effect movement of said upper and lower heads relative to one another into said beverage flavoring engagement position, to effect the passage of water through the beverage flavoring pod while the upper and lower head are in said beverage engagement position, to effect disengagement of said upper and lower heads from one another, and to effect movement of said lower head from said beverage flavoring to said pod discharge position, said upper head and lower head of said machine during operation pivots about upon the same rotation axis, provided through said support assembly of said upper head;

said lower head also including a pod ejector mechanism for discharging the beverage flavoring pod from said holding chamber therein, said pod ejector mechanism including a pod support disc associated with said holding chamber for contacting and acting against the beverage flavoring pod enclosed within said holding chamber and a spring loaded stem connected to said pod support disc, with the stem slidably disposed though the lower head to an actuator head, said stem and actuator head moving along a defined travel path as said lower head is moved from said beverage flavoring position to said pod discharge position, and a mechanical pod ejection controller for acting against said actuator head of said pod ejector mechanism to effect the discharge of the beverage pod from said holding chamber when the lower head is moved to said pod discharge position, and a mechanical pod ejection controller for acting against said actuator head of said pod ejector mechanism to effect the discharge of the beverage pod from said holding chamber when the lower head is moved to said pod discharge position, said pod ejection controller including a cam slide surface positioned to come into contact with said actuator head of said pod ejection mechanism and to increasingly compress the spring of said spring-loaded stem to apply increasing pressure to said pod support disc as said lower head is moved from said beverage flavoring position to said pod discharge position, said cam slide surface positioned to effect sufficient force through said spring loaded stem and said pod support disc to eject the beverage flavoring pod from said holding chamber and said lower head when said lower head reaches said pod discharge position, wherein said pod ejection controller includes a pod ejection controller bracket member having said cam slide surface formed thereon, said actuator head follows a generally arcuate path as said lower head is moved from said beverage flavoring position to said pod discharge position, and said pod ejector controller bracket includes an arcuately shaped portion along one edge thereof with said cam slide surface formed thereon.

2. The single cup pod beverage flavoring machine of claim 1 wherein said support assembly includes a base, upstanding spaced apart support bracket portions secured to said base, a rotatable axis member extending between said spaced apart support bracket members, and a pair of side support members for said lower head attached to the said lower head and to said axis member, rotation of said axis member effecting arcuate movement of said lower head, and said pod ejector controller bracket is mounted to said base of said support assembly at a position to dispose said cam slide surface between said side support members and to contact said actuator head of said pod ejector mechanism as the lower head is moved from said beverage flavoring position to said pod discharge position.

3. A single cup pod beverage flavoring machine that utilizes a user installable pod that contains beverage flavoring material surrounded by filter paper formed in a disc-like shape for beverage flavoring during a beverage flavoring cycle, comprising:

a) a pod holding chamber construction, having a recess therein, configured to hold the pod, said holding chamber having two separate halves comprising an upper head and a lower head with said upper head having a water inlet and said lower head having a liquid outlet;

b) a pod ejector mechanism including a spring-loaded stem slidably penetrating through said lower head and including, at one end thereof, a pod support plate sized to engage and support the pod within said holding chamber between the lower head and upper head, and, at the other end, an actuator head extending generally below said lower head;

c) an upper head mounting frame attached to a horizontal base and movably supporting said upper head;

d) a pair of lower head arcuate rotating arms for retaining said lower head, and a first shaft attached to said arms penetrating said upper head mounting frame, a first motor attached to said upper head mounting frame for rotating said shaft into at least a pod loading position, a pod flavoring position, and a pod disposal position, e) a sealing mechanism for sealing the pod within said pod holding chamber and permitting water to be introduced into said chamber during a flavoring operation, said sealing mechanism including a second motor, secured to said upper head mounting frame, and a cam driven by said second motor to effect engagement and disengagement of said upper head with said lower head;

f) a pod ejector controller including a cam slide surface for contacting said actuator head as said lower head is moved from said flavoring position to said pod disposal position to mechanically propel the pod from said chamber when said lower head is oriented generally vertically in the pod disposal position, g) an electronic control system operable to control the sequence of operations during the beverage flavoring cycle; and h) an outer shell having an access slot therethrough through which the lower head is presented to a user for installation by the user of the pod into said pod holding chamber when said shaft is rotated to said pod loading position, wherein said upper head and lower head of said machine during operation pivots about upon the same rotation axis, wherein said pod ejection controller includes a pod ejection controller bracket member having said cam slide surface formed thereon, and said pod ejector controller bracket includes an arcuately shaped portion along one edge thereof with said cam slide surface formed thereon.

4. The single cup pod beverage flavoring machine of claim 3 wherein said upper head mounting frame further comprises a horizontal base, a pair of channel-shaped columns attached to said base, and a lower head positioning solenoid attached to a single channel shaped column, for positioning said lower head in the pod flavoring position.

5. The single cup pod beverage flavoring machine of claim 3 wherein said pair of lower head arcuate rotating arms further comprise a coupling attaching said first motor located on said upper head mounting frame to said first shaft.

6. The single cup pod beverage flavoring machine of claim 3 wherein said sealing mechanism further includes a pair of parallel brackets attached to said upper head mounting frame, said brackets having a pin disposed therebetween penetrating said cam such that when the cam is rotated in one direction by the second motor the cam engages the upper head on the cam's periphery urging the upper head downwardly to mate with the lower head and when the cam is rotated in the opposite direction by the second motor the pin penetrating the cam lifts the upper head away from the lower head.

7. The single cup pod beverage flavoring machine of claim 3 further including
a pod disposal bin removably housed within said outer shell to receive and store spent pods, and
an automatic pod loading, lower head door which opens by physical contact with said pod holding chamber construction and closes by gravity or spring action.

* * * * *